US006488142B1

(12) United States Patent
Herrmann et al.

(10) Patent No.: US 6,488,142 B1
(45) Date of Patent: Dec. 3, 2002

(54) APPARATUS AND SYSTEM FOR HANDLING BANDEROLES

(75) Inventors: Rainer Herrmann, Ammersbek (DE); Thomas Jung, Bayreuth (DE); Rolf Kramp, Ahrensburg (DE); Norbert Schulte, Bayreuth (DE); Wolfgang Wurf, Heinersreuth (DE); Heiko Hertrich, Bayreuth (DE)

(73) Assignee: British-American Tobacco (Germany) GmbH, Hamburg (DE)

(*) Notice: Subject to any disclaimer, the term of this patent is extended or adjusted under 35 U.S.C. 154(b) by 10 days.

(21) Appl. No.: 09/590,882

(22) Filed: Jun. 9, 2000

(30) Foreign Application Priority Data

Jun. 11, 1999 (DE) ........................................ 199 26 713
Feb. 8, 2000 (EP) ........................................ 00102160

(51) Int. Cl.[7] ........................ B65G 47/04; B65G 47/19; B65G 47/44

(52) U.S. Cl. ........................................ 198/532; 198/531

(58) Field of Search ................................ 198/530, 531, 198/532

(56) References Cited

U.S. PATENT DOCUMENTS 4,620,891 A * 11/1986 Applegate et al.
5,545,286 A 8/1996 Schaupp

FOREIGN PATENT DOCUMENTS

DE 2 218 636 10/1973
DE 197 30 307 A1 1/1999

* cited by examiner

*Primary Examiner*—D. Glenn Dayoan
*Assistant Examiner*—Scott A. Carpenter
(74) *Attorney, Agent, or Firm*—John F. Salazar; Middleton Reutlinger

(57) ABSTRACT

The invention relates to a banderole handling device including at least one cassette arranged for supplying banderoles to a banderoling machine, a closure for the discharge end of each cassette and including a cassette support, wherein each cassette is arranged substantially vertically at the cassette support and is positionable above a banderole feeder chute of the banderoling machine. In addition, the invention relates to device for arresting a cassette including banderoles relative to a banderole feeder chute of a banderoling machine, including a closure for the discharge opening of the cassette wherein the closure is configured so that it is accommodated in a receiving portion arranged in a fixed position relative to the banderoling machine or banderole feeder chute during its opening operation. The invention relates further to a system for filling cassettes with stacks of banderoles, in which the cassettes are filled by means of a banderole stack feeder.

18 Claims, 7 Drawing Sheets

Fig 7b
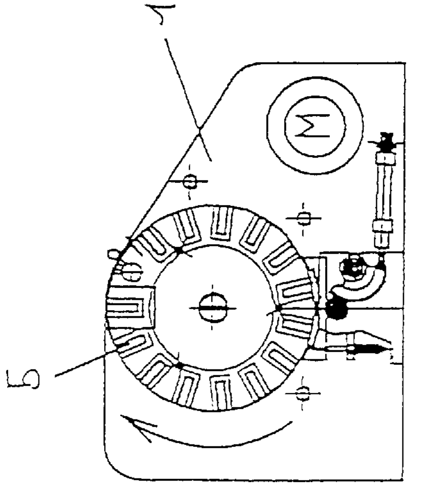
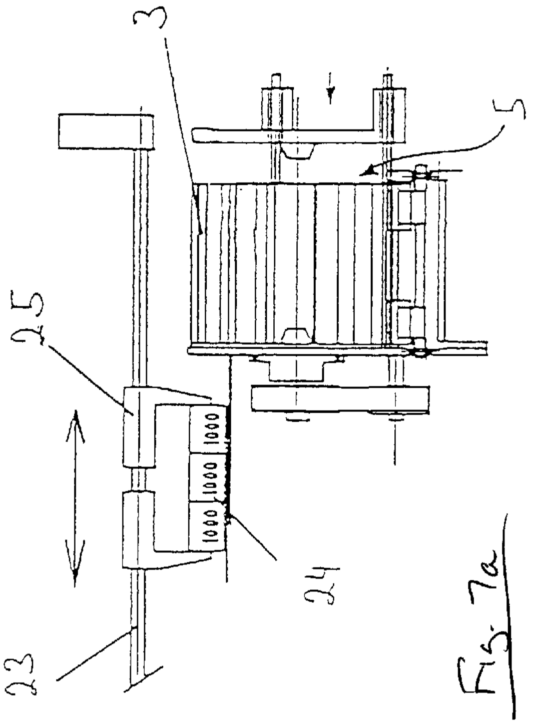
Fig 7a
Fig. 8
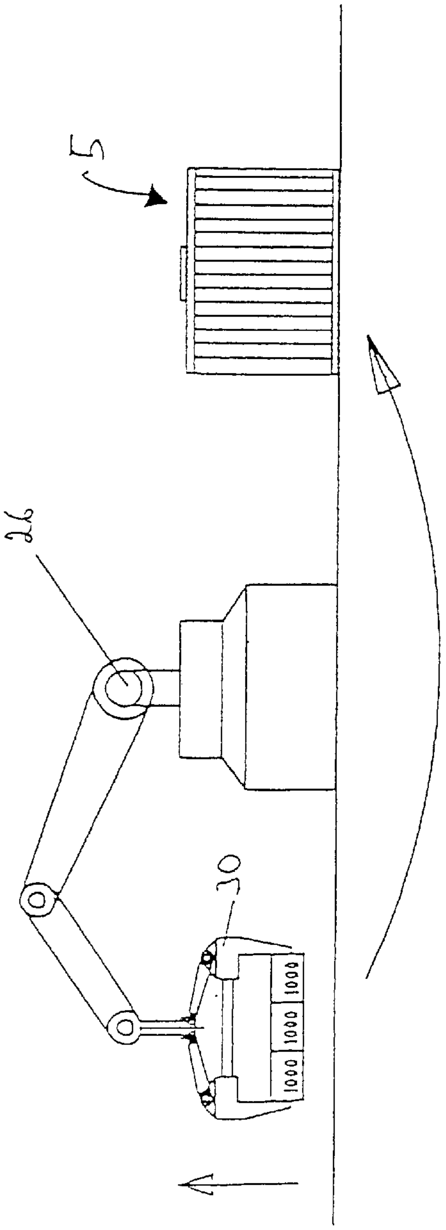

APPARATUS AND SYSTEM FOR HANDLING BANDEROLES

The present invention claims priority to a German Patent Application 199 26 713.8, filed on Jun. 11, 1999 and to a European Patent Application 00 102 160.9, filed on Feb. 8, 2000.

BACKGROUND OF THE INVENTION

1. Technical Field

The present invention relates to a device and a system for handling banderoles. In particular, the present invention being applicable to the technical field involved in banding banderoles for cigarette packs, in other words so-called revenue (tax) banderoles.

Such banderoles are dispatched as printed sheets by the pertinent tax authority of the country concerned to the user, in this case the cigarette manufacturer, where they are made available for the production line. For this purpose, the printed sheets are stacked and trimmed to the banderole format, i.e. stamped on a stamping machine. Stacks of several thousand banderoles are then conventionally provided in cases and supplied to the banderoling machine in the production line, where they are manually loaded into a banderole feeder chute.

2. Description of Related Art

The preamble of the claim 1 is based on a banderole handling device as described in DE 197 30 307 A1. In accordance with this document, the banderole stacks are delivered to the banderoling machine in a larger container-like cassette via a linear conveyor. In this arrangement, the cassette is located horizontally and comprises several parallel chambers, in each of which a stack of banderoles is accommodated. Arranged at one side of each chamber is a pusher for the stack of banderoles, while at the other end a closure member, namely a lowerable pin, is provided. Once the pin has been lowered at the discharge end of a chamber, the banderoles can be discharged by the pusher and be brought to a feeder conveyor.

The disadvantage in this system is that, due to the cassette being located horizontally, the aforementioned pusher is needed to advance or discharge the stack of banderoles. Also disadvantageous is the fact that the cassette needs to be very precisely positioned on the linear conveyor so that a stack of banderoles to be discharged also actually arrives at the correct point on the feeder conveyor for further processing, this necessitating a complicated control system.

SUMMARY OF THE INVENTION

It is thus the object of the present invention to provide a device or a system for handling banderoles which overcomes the disadvantages of the prior art systems described. More particularly, the intention being to make possible a straightforward, precise means of subsequently guiding the banderoles.

This object is achieved in accordance with the invention by the devices in accordance with claims 1 and 15 and by a system set forth in claim 19.

In the device for handling banderoles in accordance with the invention, comprising at least one cassette, arranged so that banderoles are supplied therefrom into a banderoling machine, each cassette is arranged substantially vertically in its cassette support and is positioned above a banderole feeder chute of the banderoling machine.

Advantageously, due to one such configuration in accordance with the invention, means are no longer needed to discharge the stack of banderoles from the cassette since the vertical arrangement of each cassette automatically ensures downward discharge of the banderoles by the force of gravity. It is thus now possible to simply design the cassettes accommodating the supply of banderoles without the additional complication of providing a pusher. The banderole feeder chutes of the majority of the banderoling machines on the market are arranged substantially vertically at least in their upper part so that the banderoles can now be transferred directly from a likewise vertically arranged cassette into these banderole feeder chutes. It is to be noted that the invention is also applicable to banderoling machines having slanting banderole feeder chutes; in this case, if of advantage, a vertical entry section may be configured at the upper part of the feed chute as detailed further on. The device is modular in character to thus permit directly attached construction to known banderoling machines without having to interfere with the control or mechanical system of the banderoling machine.

In an embodiment of the device in accordance with the invention, each cassette is removable from the cassette support and comprises an accommodating chute for only one stack of banderoles. In this arrangement, the advantage of the modular construction in accordance with the invention is evident. When, namely, the cassettes can be secured removable to the cassette support, then it is possible to pre-fill the cassettes with stacks of banderoles so that for refilling only one filled cassette needs to be applied to the cassette support in each case, i.e. eliminating the need to refill the individual stacks of banderoles manually which also includes the advantage that there is now no longer the risk of the banderoles being soiled or damaged on being refilled. When the cassettes, as is the case in this embodiment, comprise a chute for accommodating only a single stack of banderoles, exchanging the cassettes also becomes much easier. Cassettes having only a single banderole chute are very light and easy to handle. In particular, this represents an advantage over the system as disclosed by the aforementioned DE 197 30 307 A1, in which it is required that large heavy cassettes including several stacks most be handled. Using individual cassettes to accommodate the banderoles substantially enhances the flexibility of the device as a whole. The device permits accommodating cassettes in greatly differing banderole formats (width×length), i.e. merely requiring the cassettes to be adapted to the format by adapter rails or cassettes being used in the corresponding format.

In another preferred embodiment of the invention, the cassette support is a rotary indexing support removable from the banderoling machine having a vertically axis of rotation at the periphery of which the cassettes are arranged. Such a rotary arrangement has the advantage that a large number of cassettes filled with banderoles can be provided to the periphery of the rotary indexing support prepared and readily accessible. During operation of the machine, when a cassette has been emptied, the support can be rotated at an angle so that the next filled cassette is positioned above the banderole feeder chute of the banderoling machine and the banderole refill reassured for a lengthy period, i.e. once the cassette is empty it can be replaced by a prefilled cassette.

Advantageously, the slide or closure of each cassette is arranged position-adjustable so that it is held in a receiving portion arranged in a fixed position relative to the banderoling machine or banderole feeder chute during its opening process. In this arrangement, the slide or closure may be a slide running in a guide at the discharge opening of the cassette, it being actuatable at both sides by an opening and closing device configured more particularly as a slideactuator means. Due to the slide or closure being accommodated in the receiving portion fixed in position during the opening process, a centering and a precise positioning and arresting of the cassette above the banderole feeder chute during dispensing of banderoles is guaranteed. This eliminates the need for any complicated positioning or restraining devices after arrival of the cassettes at the banderole feeder chute since, after the cassette has been opened, it is now automatically assured that it is correctly positioned above the banderole feeder chute during dispensing of banderoles. The cassette is namely locked in the correct position when the slide is opened. The slide actuator means assure simple and speedy opening and closing of the slide especially when a pressurized air actuator is provided for the opening and closing device.

Preferably, for arranging the device in accordance with the invention on a banderoling machine, the cassette support and all substantial components of the device such as a rotary drive for the rotary indexing support, an electrical power and pressurized air supply as well as a controller are fitted to the banderoling machine by means of a beam with a supporting arm on a baseplate.

When a means for locking and unlocking each cassette in place is arranged on the cassette support, the complete cassette support, i.e. for example a complete rotary indexing support, can be moved and e.g. replaced without the cassettes becoming loose. This thus also makes it possible to remove a rotary indexing support with empty cassettes and replacing it by a rotary indexing support with filled cassettes. More particularly, this is possible without any loss of banderoles when each cassette is further provided with a slide for the end of the cassette opposite the discharge end.

As already mentioned, the invention is just as applicable for slanting banderole feeder chutes as provided on some machines, such as e.g. on banderoling machines for high-speed packaging machines. To realize the present invention using such slanting chutes the banderole feeder chute is configured so that it comprises a lower slanting chute section as well as an upper chute section curved towards the vertical at which the cassette support can then be arranged substantially vertically.

In such a configuration, there may be the problem that the banderoles need to be deflected from the vertical direction of movement into a roughly 45° slanting in the curved section. Consequently, the inclination of the banderoles in the lower slanting chute section persists with hardly any change up to the top of the chute. Thus, newly supplied stacks fail to flatly contact the banderoles previously supplied, but at a nose angle, so that banderoles are regularly kinked, this trouble resulting in downtime of the packaging machine.

This problem is solved in accordance with the invention by a device in which means for fanning the stack of banderoles located in the region of the curved section of the banderole feeder chute at its less curved side. Fanning the stack in this way has several advantages. One of the advantages achieved by this fanning effect is that the banderoles now regain their horizontal location at the top of the curved chute section, i.e. preventing persistence of the banderole inclination in the lower chute section up to the top. Now the banderoles following from above out of the cassette fall horizontally onto the banderoles likewise arranged horizontally, thus obviating the kinking and trouble as mentioned above and preventing downtimes of the packaging machines.

Yet another advantage of the fanning effect in accordance with the invention is afforded by the speedy singling of the banderoles, i.e. parting any banderoles sticking to each other, resulting in smooth, untroubled operation of the machine.

In a preferred embodiment of the above design, the fanning means are formed by protuberances jutting into the feeder chute. Advantageously, these protuberances are in turn corrugations, especially involving several crests and valleys spaced away from each other in sequence.

In general, it can be said by adapting the location, number, surface and configuration of the restrictions formed by the protuberances, various marginal conditions such as strip size tolerance, material quality and edge appearance can be optimized. When the restrictions are achieved by corrugations, the friction forces can be set by the outer chute wall being spring-loaded. When the banderoles slide past the individual corrugations, a one-sided fanning effect is achieved so that the stack of banderoles, the same in size, can be guided perpendicular to the tangent of the curvature.

Preferably, at the side of the feeder chute opposite the corrugation counterpressure elements are provided, in particular, steel counterpressure springs. This positively supports the fanning effect in that the banderoles are urged back into the valleys of the corrugation from the opposite side.

The aforementioned protuberances may be configured in some other way than the corrugation as mentioned above, namely for example as pawls, edges, profiled inserts or spring-loaded ledges, whereby any combination of such protuberances may likewise optimize the results in a particular case.

The invention relates further to a device for arresting a cassette including banderoles and a slide or closure for the discharge opening of the cassette opposite a feeder chute of a banderoling machine which is characterized in that the slide or closure is configured so that it is accommodated in a receiving portion arranged fixed in position opposite the banderoling machine or the feeder chute during the opening action. As indicated above, configuring the device in this way has the effect that the cassette, during opening of the slide or closure, is arrested at the correct position, thus eliminating the need for any excessively accurate approach control for the cassettes. In the framework of this device too, it is possible to provide a pressurized air actuator for the opening and closing device. In addition, a cassette support and the opening and closing device as well as a pressurized air supply may be fixedly positioned opposite the banderoling machine or banderole feeder chute by means of a beam including a supporting arm on a baseplate. When the closure is a slide running in a guide at the discharge opening of the cassette, actuatable on both sides by the opening and closing device, and configured more particularly as slide actuator means or push tongue means, the slide is located in the receiving portion, the receiving portion is located in the baseplate, and the baseplate is located fixed in position relative to the banderoling machine by means of the supporting arm to thus make accurately positioned arresting possible.

The invention relates furthermore to a system for filling cassettes with stacks of banderoles in which the cassettes are filled by means of a banderole stack feeder. According to the prior art, the stacks of banderoles are still loaded manually into feeder cassettes. However, this puts them at risk of being soiled or damaged or falling out of place (especially when a paper band comes undone) to the detriment of their bonding strength. It is for this reason that in the present invention a feeder is provided for automation of the filling operation of the cassettes. This banderole stack feeder permits transferring the stack of banderoles into a device as described above in various embodiments. For this purpose, the banderole stack feeder may be configured as a picker running on a rail or as a robotic arm fitted with a picker, the picker automatically picks a banderole stack, stamped and trimmed to size, and places it in the cassette. The device described in this context for accommodating the cassettes, consists of baseplate, closure device, rotary indexing support, electrical control, pressurized air actuator and slide actuator means or push tongue means can thus also be used to fill the cassettes with banderoles.

It is to be noted quite generally that, instead of the rotary indexing support for the device in accordance with the invention, also a linear conveyor means for the cassettes may be used. In the simplest case, the removable cassette may be attached to a single hanger suspended vertically above the banderole feeder chute of a banderoling machine.

BRIEF DESCRIPTION OF THE DRAWINGS

The invention will now be detailed by way of preferred embodiments with reference to the attached figures in which:

FIG. 7 is an illustration of an automatic banderole stack feeder including a picker running on a rail;

FIG. 8 is an illustration of an automatic banderole stack feeder including a robotic arm.

DETAILED DESCRIPTION OF THE PREFERRED EMBODIMENTS

Figure 1:
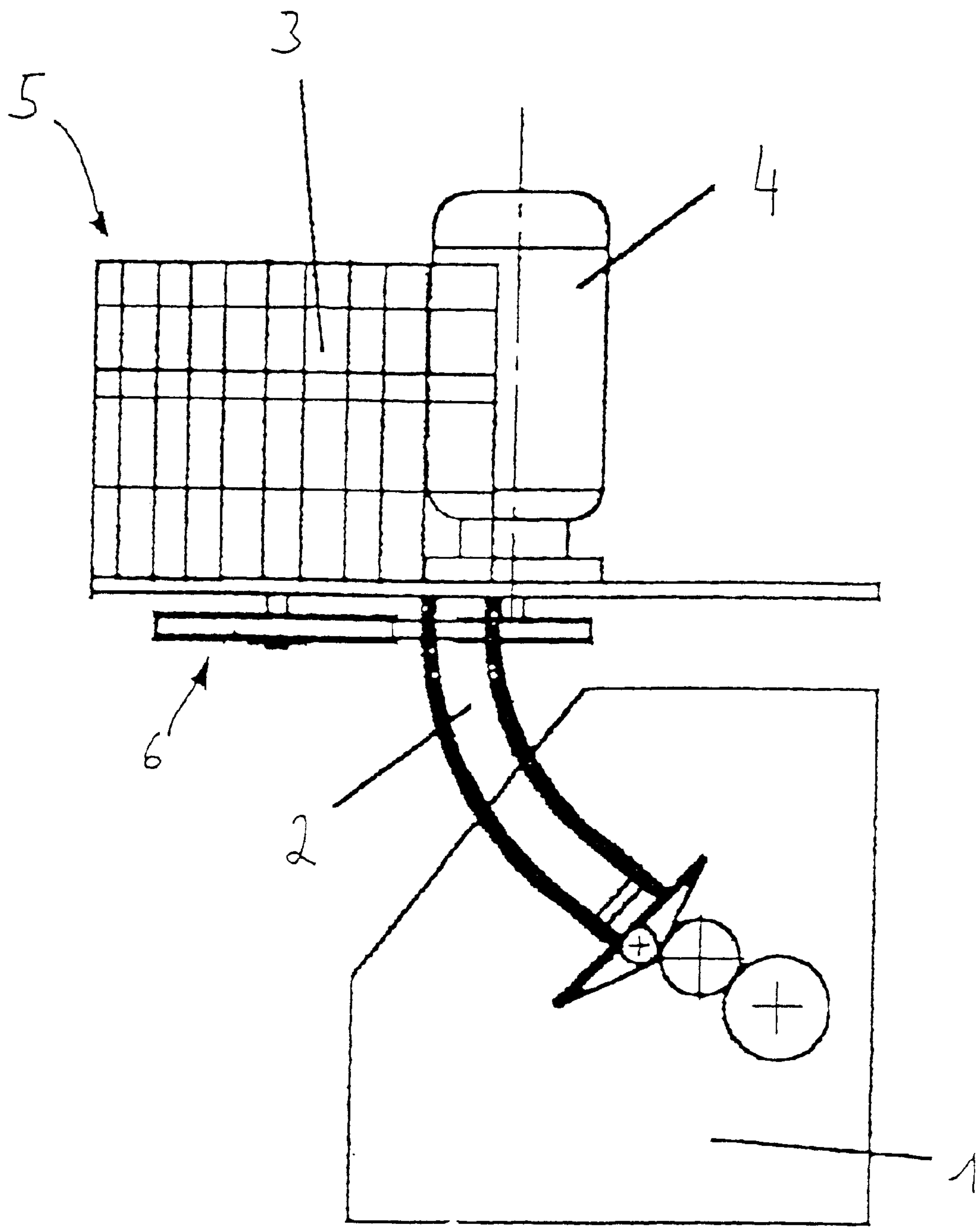
FIG. 1 is a generalized illustration of a device for handling banderoles at a banderoling machine.

Referring now to FIG. 1, illustrated highly generalized is a device in accordance with the invention. Reference numeral 1 identifies a banderoling machine which is supplied with banderole stacks via a banderole feeder chute 2. Arranged laterally above the banderole feeder chute 2 is a rotary indexing support 5 shown here in a side view, a rotary drive 6 for the rotary indexing support 5 being driven by the motor (electromotor) 4.

Arranged at the periphery of the rotary indexing support are vertical cassettes 3 containing banderole stacks. The cassette located at the outermost right-hand edge of the rotary indexing support 5 is located directly above the banderole feeder chute 2 so that banderoles can drop into the banderole feeder chute 2 to be then processed individually by the banderoling machine 1. The gist of the invention is already obvious from this highly simplified illustration, namely to feed a supply of banderoles to the banderole feeder chute 2 so that no mechanical means whatsoever are needed for discharging the banderoles from the cassettes 3, i.e. the banderoles simply drop by the force of gravity into the chute 2. It is to be noted in this case that, while using the device in accordance with the invention, the banderole feeder chute 2 is nearly always completely full during operation so that the banderoles, when a cassette 3 is opened downwards, need to drop only over a very small distance so that there is no tilting.

Figure 2:
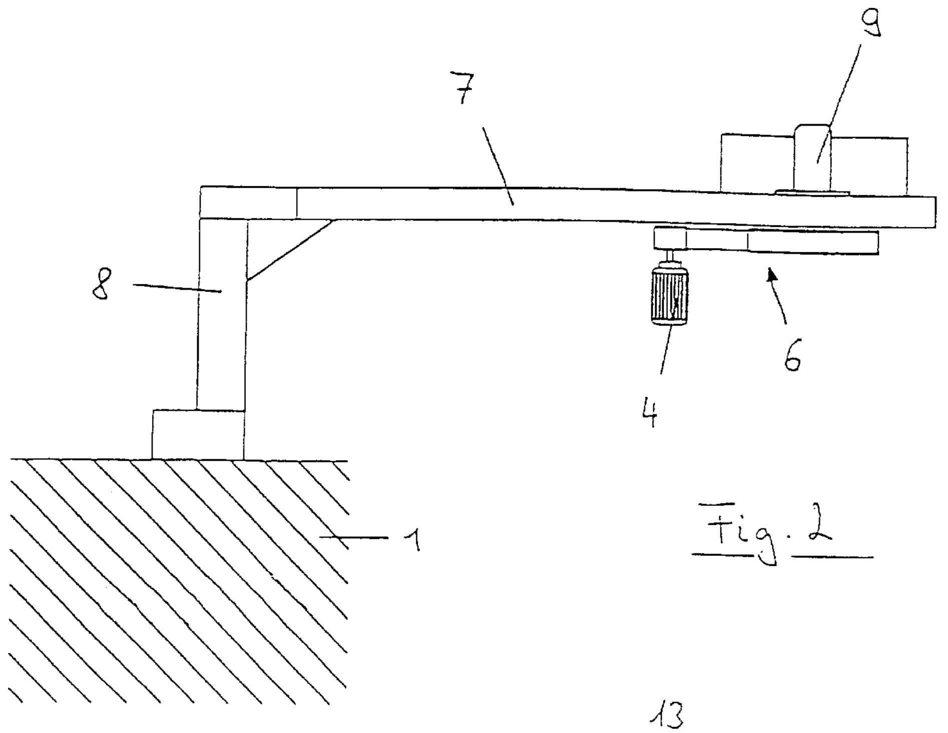
FIG. 2 is a side view of a beam secured to a banderoling machine for mounting a device in accordance with the invention.
Figure 6A:
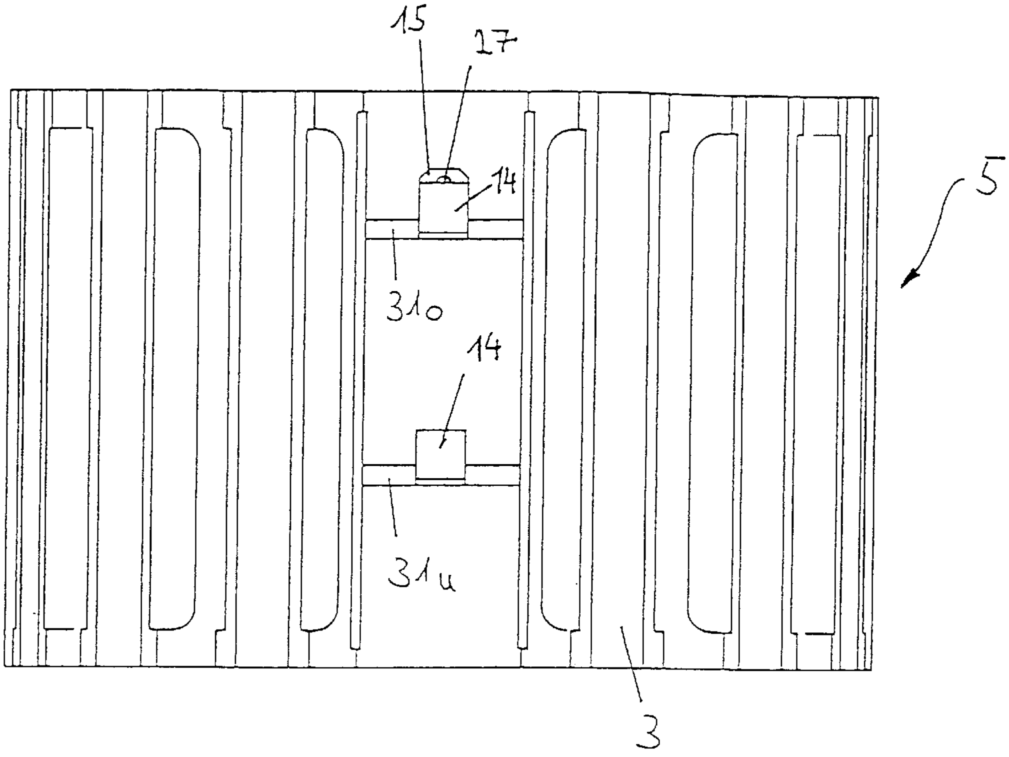
FIG. 6 is a side view and plan view of a cassette rotary indexing support for a device in accordance with the invention.
Figure 6B:
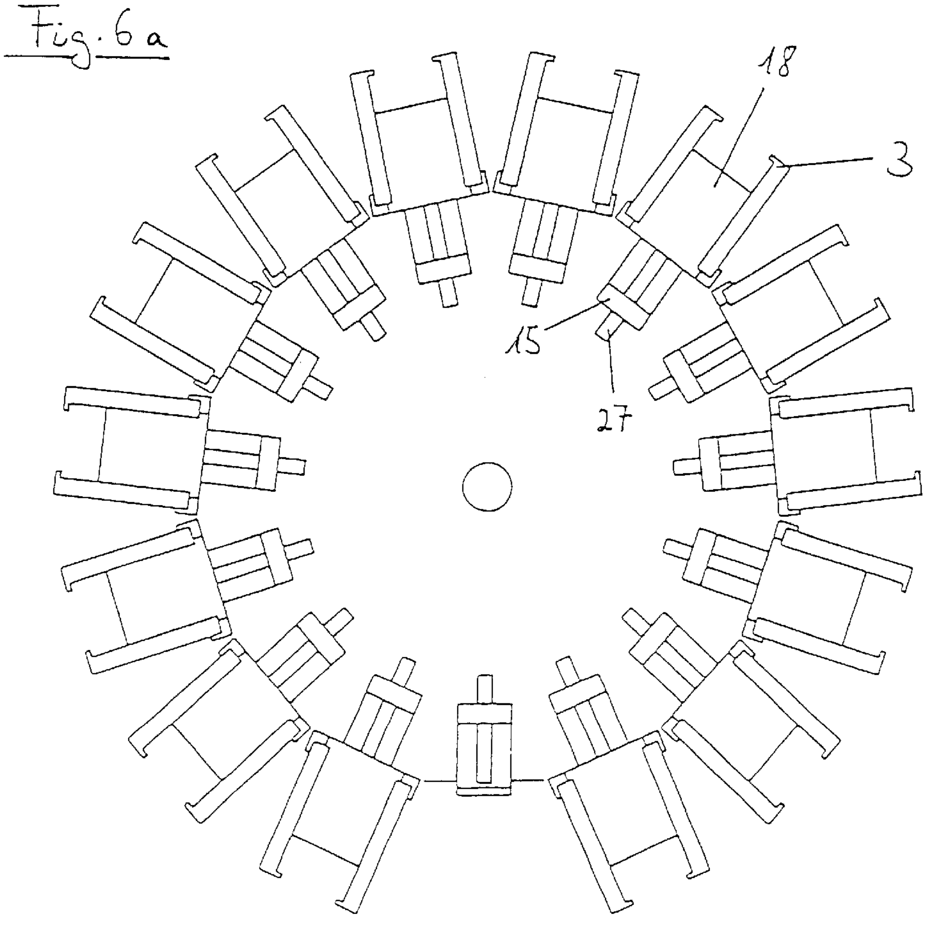

In FIG. 2 it is now be shown in detail, with reference to FIG. 6 illustrating the rotary indexing support in more detail, how such a rotary indexing support 5 can be fitted to the banderoling machine 1. The supporting arm 8 is swivel-jointed to the banderoling machine 1 and holds a baseplate 7. In the preferred swivel-type design, operating the banderoling machine is not impaired and if trouble occurs, or in maintenance work, the baseplate 7 can be swiveled out of the way. Arranged at the baseplate 7 are all elements of the device in accordance with the invention, of which only the motor 4 and the belt drive 6 are evident from FIG. 2, permitting rotation of an arbor 9 protruding from the upper side of the baseplate. The arbor 9 carries the rotary indexing support 5 and the connection may be, for example, a detachable conical fit.

Figure 3:
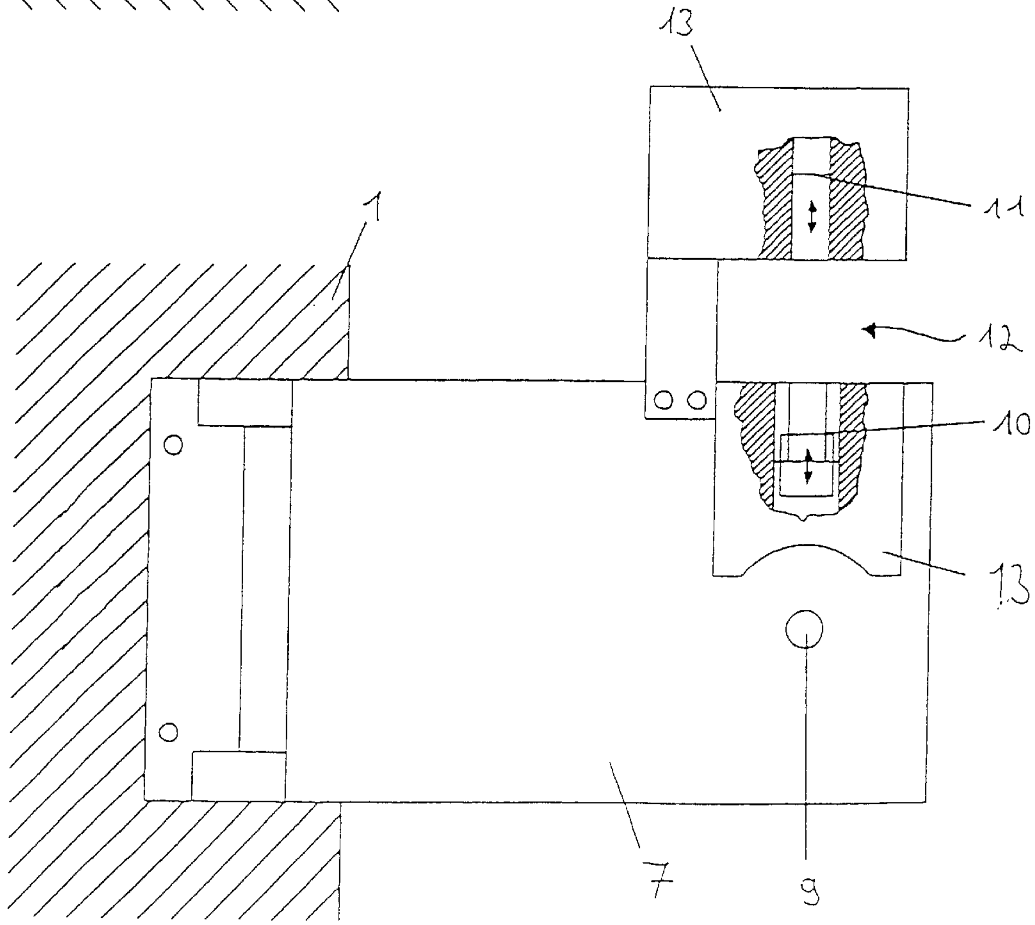
FIG. 3 is a plan view of the beam of FIG. 2 showing an opening and closing mechanism for a banderole cassette.

As shown in FIG. 3, the baseplate comprises the opening and closing mechanism in the section 13, configured two-part and comprising in the middle an opening 12 which during operation receives the lower part of a cassette and the upper part of a banderole feeder chute 2. In the fragmented view, it is evident that the opening and closing mechanism comprises two push tongues or actuators 10 and 11 on both sides of the opening 12, the actuator or pusher 11 being responsible for opening the cassette closure or slide. The actuator or pusher 10 effects, on the other hand, closing of the cassette closure or slide. The opening and closing action of the cassette closure or slide is shown in more detail in FIG. 4.

Figure 4:
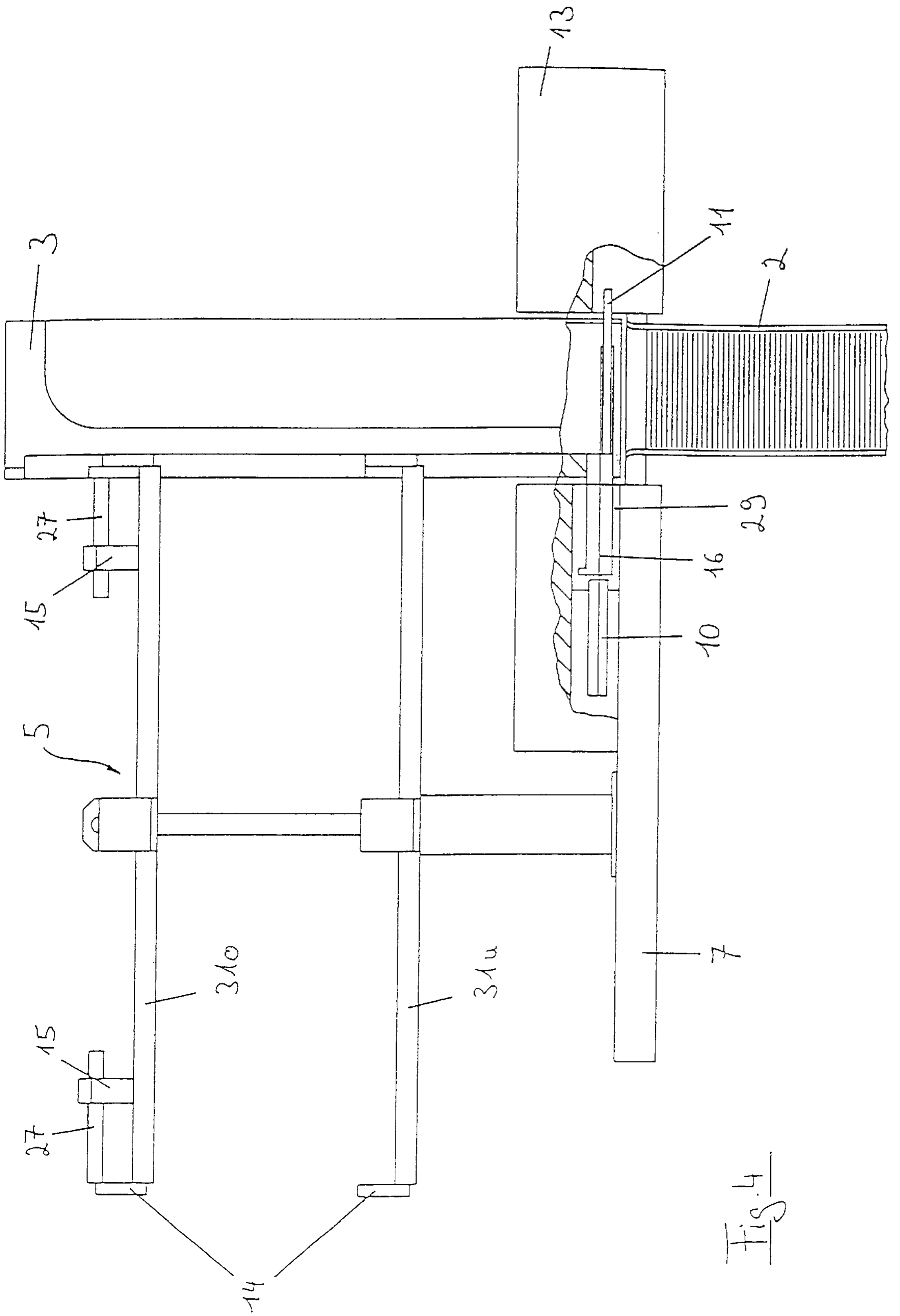
FIG. 4 is a side view of a device in accordance with the invention.

FIG. 4 illustrates a side view of a device in accordance with the invention. Rotatably mounted on the baseplate 7 in the left-hand portion is the rotary indexing support 5 serving as cassette support. The rotary indexing support 5, as evident from FIG. 6, consists of a center mount (not identified) and two peripheral supports 31*o* (upper) and 31*u* (lower). At its periphery, each of the peripheral supports 31*o* and 31*u* features a hook 14 distributed peripherally so that cassettes 3 can be attached juxtaposed. Illustrated on the right-hand side in FIG. 4 is an attached cassette 3 which is additionally arrested by means of a locator comprising an appendage 15 and a pin 27 spring-loaded to penetrate a hole in the back of the cassette 3.

By means of the drive shown in FIG. 2 the rotary indexing support is always rotated until the next filled cassette is located above the banderole feeder chute 2, this being achievable by means of a photocell control arrangement (not shown).

Figure 5A:
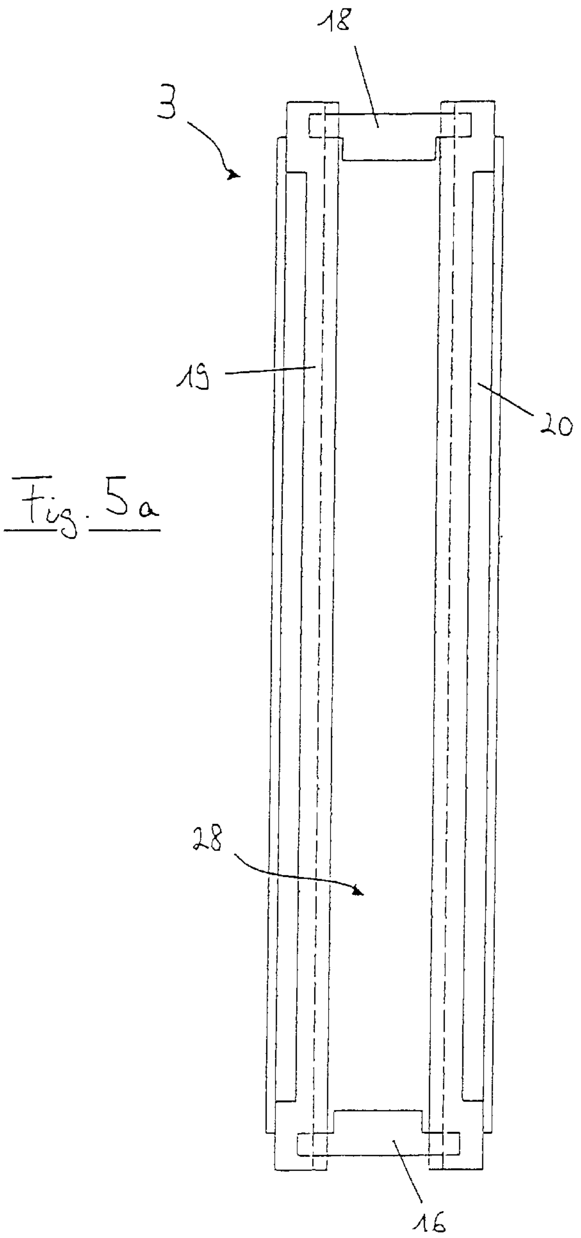
FIG. 5 is an illustration in three views of a cassette for a device in accordance with the invention.
Figure 5B:
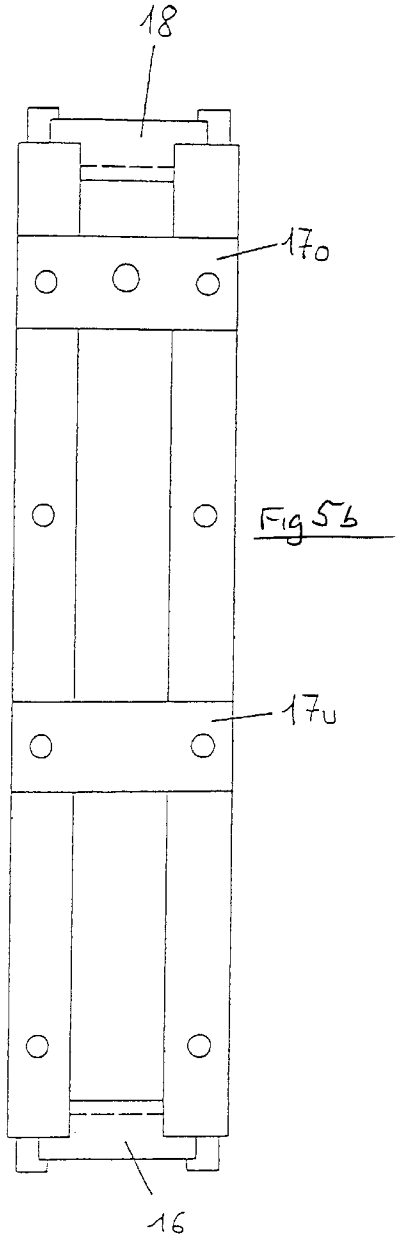
Figure 5C:
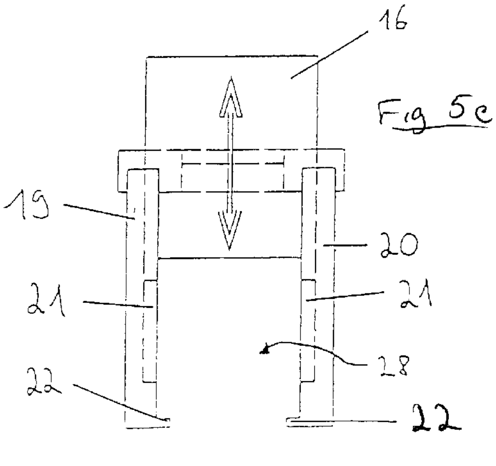

As already mentioned, the cassette 3, which can be seen from the side in FIG. 4, is located above the banderole feeder chute 2 in the opening 12 which is seen from above in FIG. 3. Before going into the opening and closing mechanism in detail, the structure of a cassette will first be discussed with reference to FIG. 5. In FIG. 5 the cassette is shown in three views, of which the left-hand upper view is a frontal view of the open part of the cassette and the right-hand upper view is a rear view. Illustrated below the frontal view is a face view.

The cassette consists essentially of the two sidewalls 19 and 20 held at a specific distance from each other via a backplate (not indicated). Running via an opening in the backplate are the mounting struts 17*o* (upper) and 17*u* (lower). As evident from the face view as illustrated at the bottom, the cassette thus forms a receiving chute 28 in which the banderoles can be inserted stacked. Arranged at the lower discharge side of the cassette 3 is a cassette closure as a slide 16 running in a guide 21 incorporated on both sides at the lower end of the sideplates 19 and 20. The slide 16 can be shifted backwards in the guide 21 so that the discharge end of the cassettes 3 is opened and the banderoles can drop out. A half-open position is illustrated in the face view.

In addition, the cassette comprises a further slide 18 likewise guided at the top, by means of which the cassette is thus fully closable. When both slides 16, 18 are closed, the banderoles contained in the cassette 3 can no longer fall out regardless of the position of the cassette 3, since the front portion is restricted in each case by the noses 22 on the sideplates.

Keeping in mind the design of the slide 16 as shown in FIG. 5, it will now be better appreciated how the opening and closing mechanism works as shown in fragmented detail in FIG. 4. As already indicated, FIG. 4 shows the cassette in a side view and it is evident from the fragmented view that the slide 16 in this case is extended to the left, i.e. is located in the open position, it being located in the receiving portion 29 where it is precisely centered in position relative to the banderole feeder chute 2. This precise centering results from the receiving portion 29 being fixedly arranged relative to the baseplate 7 which, in turn, is fixedly secured to the banderoling machine 1 and thus is likewise precisely positioned relative to the banderole feeder chute 2 during dispensing of the banderoles. Thus, when the slide 16 is introduced into the receiving portion 29 by the actuator 11, viewed from the side in FIG. 4, then the cassette is always arrested in the correct position relative to the banderole feeder chute 2. This obviates any need for the rotary indexing support to maintain a precise position and the correct arrangement of the cassette 3 is always automatically assured after the slide is arrested in the correct position during dispensing of the banderoles.

Like the actuator 11 being provided for opening the slide 16 so, too, is actuator 10 arranged at the opposite side which, on being extended to the right, positions the slide 16 in the stopped closed position for the cassette 3. These two actuators 10, 11 need to move very quickly, this being the reason why they are powered with pressurized air. The respective pressurized air lines as well as the power cables for the motor 4 in each case are likewise fitted to or in the baseplate 7.

Accordingly, when a cassette 3 filled with banderoles is positioned above the banderole feeder chute 2 by indexing of the rotary indexing support 5, the actuator 11 pushes reciprocally the slide 16 to the left and springs back into place so that banderoles are able to fall from the cassette 3 into the feeder chute 2. When the cassette 3 has become empty, after a certain time, the actuator 10 pushes the slide 16 back into the closed position and the rotary indexing support 5 rotates further until a cassette 3 filled with banderoles is again positioned above the feeder chute 2. On being opened, i.e. after the new cassette has been shifted to the left by the indexing support 5, the slide 16 is received by the receiving portion 29 and arrested to thus center-locate the cassette 3 precisely positioned above the feeder chute 2.

Illustrated in FIGS. 7 and 8 are two embodiments of a system in accordance with the invention for filling cassettes with stacks of banderoles. On the right-hand side, FIG. 7 shows a view from above of a banderoling machine 1 with a rotary indexing support 5 mounted thereon. In the tilted view, as shown on the left thereof, it is evident how stacks of banderoles 24 are introduced into a cassette 3 by a picker 25 running on a rail 23 into the rotary indexing support 5, thus obviating a manual feed and possible damage of the banderoles.

FIG. 8 illustrates a further automatic filling means in which a picker 30 is arranged on a robotic arm 26. The picker 30 also feeds the banderoles stack by stack to the rotary indexing support 5.

Figure 9:
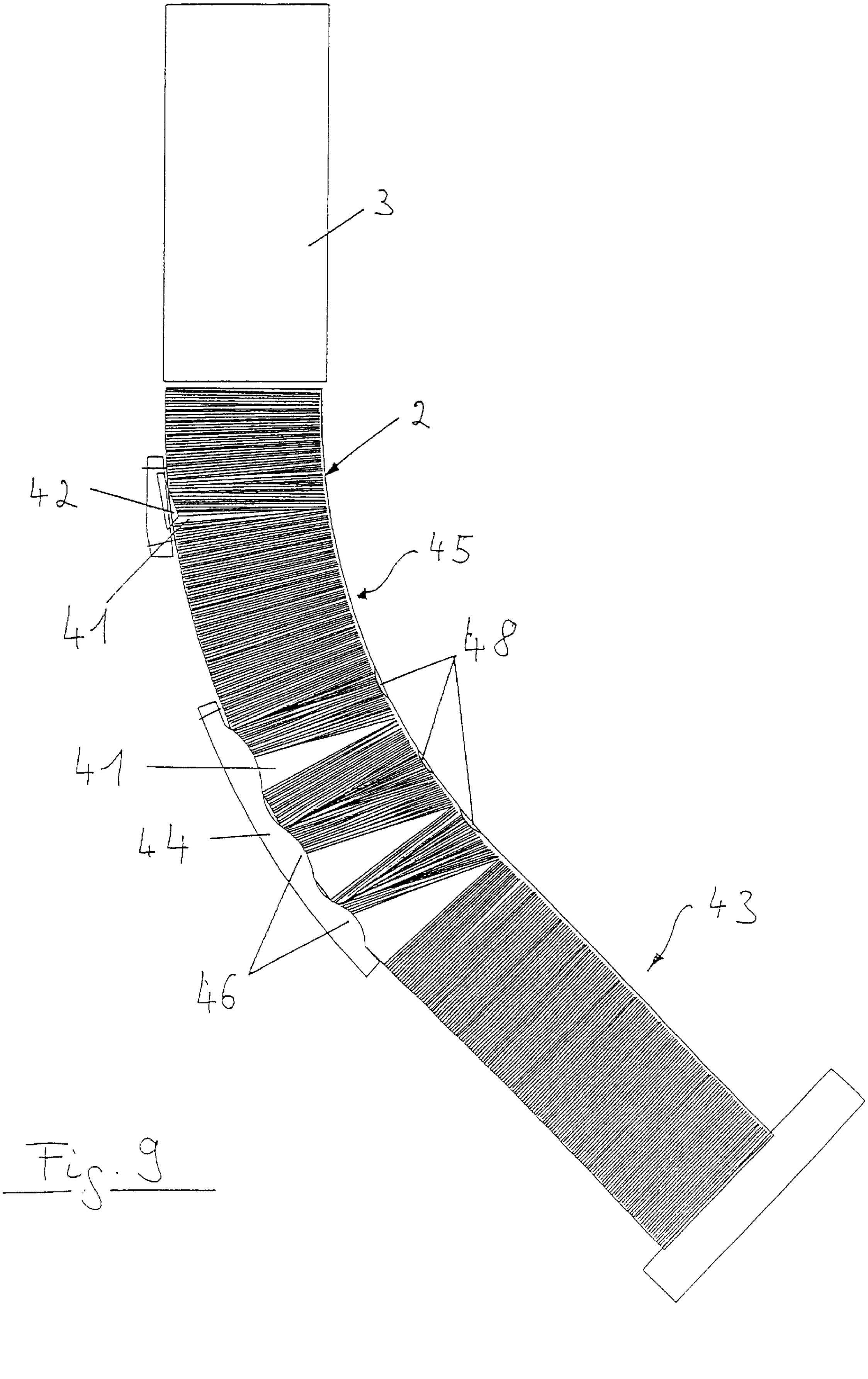
FIG. 9 is an illustration of a banderole stack feeder including a fanning means.

In FIG. 9 there is illustrated, in conclusion, a further aspect of the present invention, namely a preferred embodiment of a banderole feeder chute 2 curved in the upper portion, as already illustrated in principle in FIG. 1. Some high-speed packaging machines currently on the market comprise a banderole feeder chute oriented slanting in the lower portion. In order that the present invention with its vertically arranged cassettes can be used with these packers, these chutes need to be configured curved to the vertical in their upper portion. Evident from FIG. 9 is one such banderole feeder chute 2 below a cassette 3 comprising a slanting, straight, lower chute section 43 as well as an upper chute section 45 curved to the vertical.

To prevent the banderoles at the top of the upper chute section 45 from being located slanting like in the lower chute section 43 fanning means are applied to the left-hand outer side, i.e. to the less curved side of the chute of FIG. 9. As an example, a pawl 42 is shown in FIG. 9 on the outside of the upper chute section 45 as well as a corrugation 44 illustrated slightly below.

Due to the pawl 42 jutting into the chute as well as due to the crests 46 of the corrugation 44, the banderoles are fanned at this side of the chute, as shown, i.e. angled vacant zones 41 materializing.

This fanning effect has two advantages to be especially highlighted. One is that the banderoles at the top of the curved upper chute section 45 retain their substantially vertical location so that the banderoles dropping out of the cassette in a substantially horizontal location fall onto the likewise horizontally located upper part of the stack in the banderole feeder chute 2 to thus enable kinking, interruptions and downtimes of the packer to be avoided. The second advantage is due to the fact that while fanning the stack of banderoles in the upper chute section 45—because the banderoles are advanced downwards—a singling effect materializes at the same time, resulting in the banderoles being temporarily singled. Thus, any banderoles sticking together can be separated from each other, ensuring smooth, troublefree operation of the packaging machine.

Depending on the embodiment and particular features of the banderoles, corrugations 44 and pawls 42 may be used singly or multiply or arranged singly in sequence, whereby any combination thereof is also possible.

To enhance fanning or singling for an even more positive effect, counterpressure elements are arranged at the inner side of the upper chute section 45, i.e. at its more strongly curved side, these being shown in FIG. 9 as three single, round steel springs 48. The light spring pressure exerted by these steel springs 48 results in the banderoles at the opposite side being urged back into the valleys of the corrugation 44 to promote the singling effect.

With such an embodiment of the banderole feeder chute as illustrated, the present invention finds universal application, i.e. can also be used in conjunction with packaging machines having slanting banderole feeders.

What is claimed is:

1. A banderole cassette arresting device opposite a feeder chute on a banderole machine, comprising:

a banderole cassette having a discharge end and a slide slidably actuatable at said discharge end;

an opening mechanism banderole cassette arresting device actuatable on said slide of said cassette;

said slide of said cassette received within a receiving portion adjacent said banderole machine upon actuation of said opening mechanism.

2. The banderole cassette arresting device of claim 1, further comprised of a closing mechanism.

3. The banderole cassette arresting device of claim 2 wherein said opening mechanism and said closing mechanism is comprised of a first actuator actuatable in a first direction and a second actuator actuatable in a second direction.

4. The banderole cassette arresting device of claim 3 wherein said opening mechanism and said closing mechanism is a pressurized air actuator.

5. The banderole cassette arresting device of claim 3 wherein said second actuator is adjacent said receiving portion.

6. The banderole cassette arresting device of claim 1 further comprising an arresting mechanism on a cassette support, said arresting mechanism contacting said cassette at a position opposite said slide.

7. The banderole cassette arresting device of claim 6 wherein said arresting mechanism is a locator and a slidable pin extending through said locator.

8. The banderole cassette arresting device of claim 6 wherein said cassette support is a rotary indexing support removable from said banderole cassette arresting device.

9. The banderole cassette arresting device of claim 1 wherein said cassette further has a guide at said discharge end with first and second runners, said runners slidably retaining said slide.

10. The banderole cassette arresting device of claim 1 wherein said cassette is retained in a position substantially vertical relative to said feeder chute of said banderole machine.

11. The banderole cassette arresting device of claim 1 wherein said receiving portion is adjacent to a closing mechanism and arrests said cassette in a vertical position by receiving said slide.

12. The banderole cassette arresting device of claim 11, wherein said feeder chute between said arresting device and said banderole machine has a lower and an upper slanting feeder chute section, said upper slanting feeder chute section vertically curved, said feeder chute further having fanning protuberances on an interior surface of said chute.

13. The banderole arresting device of claim 12 wherein said protuberances are corrugations having crests and valleys in sequence on said interior.

14. The banderole cassette arresting device of claim 1 wherein said cassette further has a second slide opposite said discharge end.

15. The banderole cassette arresting device of claim 1 wherein said receiving portion is located within a base plate adjacent said banderole machine, said slide received within said receiving portion upon actuation of said opening mechanism to fixedly vertically position said cassette.

16. A banderole cassette arresting device opposite a feeder chute on a banderole machine, comprising:

a receiving chute on said banderole machine;

a receiving portion adjacent a top open end of said feeder chute in said arresting device;

a banderole cassette having a discharge end and a slide slidably actuatable at said discharge end;

an opening mechanism and closing mechanism on said banderole cassette arresting device actuatable on said slide of said cassette;

said slide of said cassette received within said receiving portion adjacent said banderole machine upon actuation of said opening mechanism;

a rotary indexing support holding said cassette and removable from said banderole cassette arresting device.

17. The arresting device of claim 16 wherein said receiving portion is an opening in a base plate of said arresting device adjacent said banderole machine.

18. A banderole cassette arresting device opposite a feeder chute on a banderole machine, comprising:

a banderole cassette having a discharge end and a slide slidably actuatable at said discharge end;

an opening mechanism and closing mechanism on said banderole cassette arresting device actuatable on said slide of said cassette;

said slide of said cassette received within a receiving portion adjacent said banderole machine upon actuation of said opening mechanism;

said opening mechanism having a first actuator actuatable in a first direction and said closing mechanism having a second actuator actuatable in a second direction;

said second actuator is adjacent said receiving portion, said receiving portion formed within a base plate adjacent said banderole machine.

* * * * *